United States Patent
Nakanishi et al.

(10) Patent No.: US 12,090,993 B2
(45) Date of Patent: Sep. 17, 2024

(54) MOBILE OBJECT CONTROL SYSTEM, MOBILE OBJECT, CONTROL METHOD, AND STORAGE MEDIUM

(71) Applicant: HONDA MOTOR CO., LTD., Tokyo (JP)

(72) Inventors: Kosuke Nakanishi, Wako (JP); Misako Yoshimura, Wako (JP); Yosuke Koike, Wako (JP); Ichiro Baba, Wako (JP); Koki Aizawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 298 days.

(21) Appl. No.: 17/679,228

(22) Filed: Feb. 24, 2022

(65) Prior Publication Data
US 2022/0297680 A1 Sep. 22, 2022

(30) Foreign Application Priority Data
Mar. 17, 2021 (JP) ................................ 2021-043222

(51) Int. Cl.
*B60W 30/08* (2012.01)
*G06V 20/58* (2022.01)
*G08G 1/01* (2006.01)

(52) U.S. Cl.
CPC ............. *B60W 30/08* (2013.01); *G06V 20/58* (2022.01); *G08G 1/0133* (2013.01); *G08G 1/0141* (2013.01); *B60W 2554/4029* (2020.02); *B60W 2554/4049* (2020.02)

(58) Field of Classification Search
None
See application file for complete search history.

(56) References Cited

U.S. PATENT DOCUMENTS

| | | | | |
|---|---|---|---|---|
| 11,480,962 | B1* | 10/2022 | Dax | G05D 1/0088 |
| 2018/0197414 | A1* | 7/2018 | Oooka | G08G 1/167 |
| 2020/0124430 | A1* | 4/2020 | Bradlow | B62J 45/412 |
| 2021/0133466 | A1* | 5/2021 | Gier | G05D 1/0223 |
| 2021/0191424 | A1* | 6/2021 | Drayna | G05D 1/0291 |

FOREIGN PATENT DOCUMENTS

| | | |
|---|---|---|
| JP | 2013-239035 | 11/2013 |
| JP | 2018-092441 | 6/2018 |
| JP | 2020-035228 | 3/2020 |
| JP | 2020-185889 | 11/2020 |

OTHER PUBLICATIONS

Japanese Office Action for Japanese Patent Application No. 2021-043222 mailed Nov. 8, 2022.
Japanese Notice of Allowance for Japanese Patent Application No. 2021-043222 mailed Apr. 18, 2023.

* cited by examiner

*Primary Examiner* — Amelia Vorce
*Assistant Examiner* — Kyle S Park
(74) *Attorney, Agent, or Firm* — Amin, Turocy & Watson, LLP

(57) ABSTRACT

A mobile object control system includes: a storage device configured to store a instructions; and one or more processors, wherein the one or more processors execute the instructions stored in the storage device to: determining whether a roadway is a pedestrian road in which passage of vehicles is restricted; expanding a movable area in which the mobile object can move in a width direction of the roadway when it is determined that the roadway is the pedestrian road; and controlling the mobile object based on the movable area.

14 Claims, 12 Drawing Sheets

MOBILE OBJECT CONTROL SYSTEM, MOBILE OBJECT, CONTROL METHOD, AND STORAGE MEDIUM

CROSS-REFERENCE TO RELATED APPLICATION

This application claims priority to and the benefit from Japanese Patent Application No. 2021-043222, filed on Mar. 17, 2021, the contents of which are hereby incorporated by reference into the present application.

FIELD

The present invention relates to mobile object control systems, mobile objects, control methods, and storage media.

DESCRIPTION OF RELATED ART

Conventionally, a route generation method for generating a route of a mobile object has been disclosed (Japanese Unexamined Patent Application, First Publication No. 2013-239035). In this method, the sensor direction of a rotatable sensor is acquired, the search option is extended from the destination to generate route points, the search option is extended so that the previously generated route point falls within the sensor measurement range to determine the sensor direction and determine the movement speed, and a total cost of the sensor rotation cost and the movement time cost of the mobile object calculated based on the acquired sensor angle is calculated. When the search option does not reach the current location of the mobile object, the search option with the minimum total cost is selected to generate a new route point, and the search option is repeatedly extended until the search option reaches the current location of the mobile object.

SUMMARY

However, in the above-described technology, since the cost is simply emphasized without considering the surrounding situation, a route corresponding to the surrounding situation may not be generated, and appropriate control according to the surrounding situation may not be realized.

With the foregoing in view, one of the objects of the present invention is to provide a mobile object control system, a mobile object, a control method, and a storage medium capable of realizing more appropriate control according to the surrounding situation.

As an example, a candidate range for moving a mobile object is set according to the surrounding situation, and a trajectory for moving the mobile object is generated within that range, so that the mobile object can be better controlled according to the surrounding situation.

The mobile object control system, mobile object, control method, and storage medium according to the present invention have the following configurations.

(1) A mobile object control system according to an aspect of the present invention includes: a storage device configured to store a instructions; and one or more processors, wherein the one or more processors execute the instructions stored in the storage device to: determine whether a target roadway is a pedestrian road in which passage of vehicles is restricted; expand a movable area in which the mobile object can move in a width direction of the target roadway when it is determined that the target roadway is a pedestrian road; and control the mobile object based on the movable area.

(2) In aspect (1), the one or more processors execute the instructions stored in the storage device to: expand the movable area so as to include more roadway areas when it is determined that the target roadway is a pedestrian road.

(3) In aspect (1) or (2), the one or more processors execute the instructions stored in the storage device to: expand the movable area in a width direction of the target roadway by expanding a search range for the movable area in the width direction of the target roadway when it is determined that the target roadway is the pedestrian road.

(4) In any one of aspects (1) to (3), the one or more processors execute the instructions stored in the storage device to: expand the movable area in a width direction of the target roadway when a destination of the mobile object is present in the pedestrian road or is adjacent to the pedestrian road more than when the destination of the mobile object is not present in the pedestrian road or is not adjacent to the pedestrian road.

(5) In any one of aspects (1) to (4), the one or more processors execute the instructions stored in the storage device to: expand the movable area in a width direction of the target roadway so as to include an area in front in a direction opposite to a side where the mobile object has deviated in a road in front of the target roadway or in the target roadway.

(6) In any one of aspects (1) to (5), the one or more processors execute the instructions stored in the storage device to: move the mobile object along a trajectory generated based on a lane mark close to a center of the target roadway in the pedestrian road.

(7) In any one of aspects (1) to (6), the one or more processors execute the instructions stored in the storage device to: expand the movable area in a width direction of the target roadway after the mobile object enters the pedestrian road.

(8) In any one of aspects (1) to (7), the one or more processors execute the instructions stored in the storage device to: expand the movable area in a width direction of the target roadway before the mobile object enters the pedestrian road when a specific event that restricts movement of the mobile object has not occurred or is expected to not occur in an area in front of the pedestrian road.

(9) In any one of aspects (1) to (8), the one or more processors execute the instructions stored in the storage device to: determine a degree of congestion for each road included in the movable area and move the mobile object based on a road with a low degree of congestion.

(10) In any one of aspects (1) to (9), the movable area includes a first sidewalk, a second sidewalk, and a roadway provided between the first sidewalk and the second sidewalk on the pedestrian road, and the one or more processors execute the instructions stored in the storage device to: move the mobile object so as to cross the roadway to move to the second sidewalk and direct the mobile object to head for a destination or a waypoint when the destination or waypoint of the mobile object present on the first sidewalk or the roadway is present in a direction of the second sidewalk.

(11) In any one of aspects (1) to (10), the movable area includes a sidewalk and a roadway on the pedestrian road, and the one or more processors execute the instructions stored in the storage device to: select a route from a route for moving on the sidewalk, a route for moving on the roadway, and a route that crosses the roadway based on one or more factors of a destination of the mobile object, a degree of congestion of objects on the pedestrian road, and a request regarding a movement route designated by a user of the mobile object and move the mobile object along the selected route.

(12) A mobile object equipped with the mobile object control system according to any one of aspects (1) to (11).

(13) A control method according to an aspect of the present invention is a control method for causing a computer to execute: determining whether a target roadway is a pedestrian road in which passage of vehicles is restricted; expanding a movable area in which the mobile object can move in a width direction of the target roadway when it is determined that the target roadway is the pedestrian road; and controlling the mobile object based on the movable area.

(14) Instructions stored in a storage medium according to an aspect of the present invention is instructions for causing a computer to execute: determining whether a target roadway is a pedestrian road in which passage of vehicles is restricted; expanding a movable area in which the mobile object can move in a width direction of the target roadway when it is determined that the target roadway is the pedestrian road; and controlling the mobile object based on the movable area.

According to aspects (1) to (14), since the mobile object control system can expand the movable area according to the surrounding situation, it is possible to realize more appropriate control according to the surrounding situation. For example, on a road in which traffic participants who are allowed to pass change every period, control according to the condition of the road is realized.

According to aspect (4), the mobile object control system can move the mobile object to the destination more reasonably by changing the movable area based on the position of the destination.

According to aspect (5), the mobile object control system can expand the movable area so that the options for the range of movement of the mobile object are expanded.

According to aspect (6), the mobile object control system can allow the mobile object to move on the pedestrian road more smoothly by moving the mobile object near the center of the roadway.

According to aspect (9), the mobile object control system can allow the mobile object to move on the pedestrian road more smoothly by moving the mobile object on an uncongested road or area included in the movable area.

According to aspect (10), the mobile object control system can allow the mobile object to head toward the destination more reasonably by allowing the mobile object to cross the roadway.

According to aspect (11), the mobile object control system can allow the mobile object to move on the pedestrian road reasonably while improving the user's satisfaction by selecting a route on a pedestrian road based on a plurality of factors and moving the mobile object along the selected route.

DETAILED DESCRIPTION

Hereinafter, the mobile object control system, the mobile object, the control method, and the storage medium according to the embodiment of the present invention will be described with reference to the drawings. As used throughout this disclosure, the singular forms "a," "an," and "the" include plural reference unless the context clearly dictates otherwise.

First Embodiment

[Overall Configuration]

Figure 1:
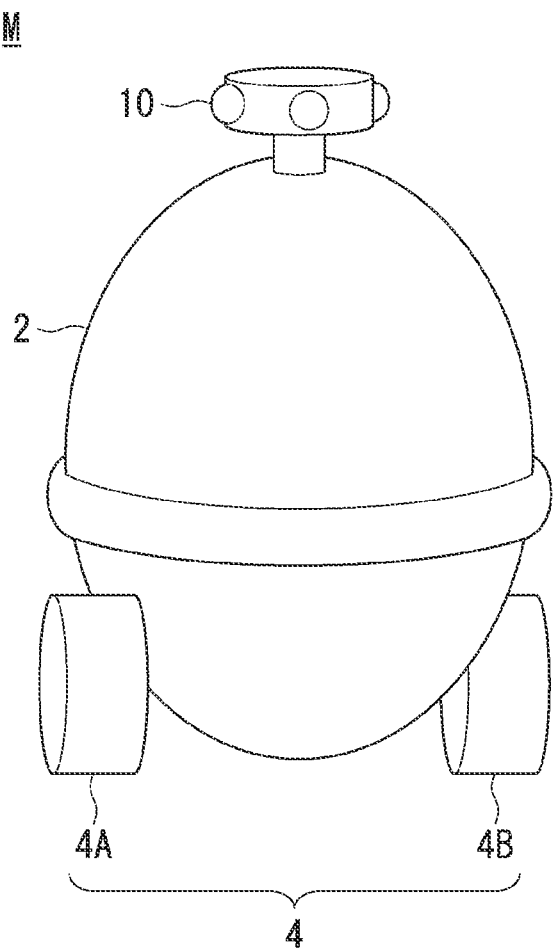
FIG. 1 is a diagram showing an example of a mobile object including a control device according to an embodiment.

FIG. 1 is a diagram showing an example of a mobile object M including a control device according to an embodiment. The mobile object M is an autonomous mobile robot. The mobile object M supports the user's behavior. For example, the mobile object M stops at a position designated by the user, carries the user, and transports the user to the destination. In the present embodiment, the mobile object M is described as moving while carrying the user aboard. However, instead of this (or in addition to this), the mobile object M may transport an article or lead the user to move together with the user and may follow the user to support the user's behavior, and the mobile object M may or may not be able to carry the user aboard.

The mobile object M includes a main body 2, one or more wheels 4 (4A and 4B in the figure), and a camera 10. The main body 2 is provided with an entrance and exit such as a door (not shown) that allows the user to enter and exit the main body 2, and the user can enter the main body 2 from the entrance and exit and board the mobile object M. For example, the mobile object M drives the wheel 4 based on the image captured by the camera 10 to transport the user.

In the present embodiment, the user is described as boarding in the main body 2. However, instead of this (or in addition to this), the mobile object M may be provided with a seating portion on which the user can be seated without boarding in the main body 2 to move together with the mobile object M, a step on which the user puts his/her foot for movement, and the like. For example, the moving object may be scooter.

Figure 2:
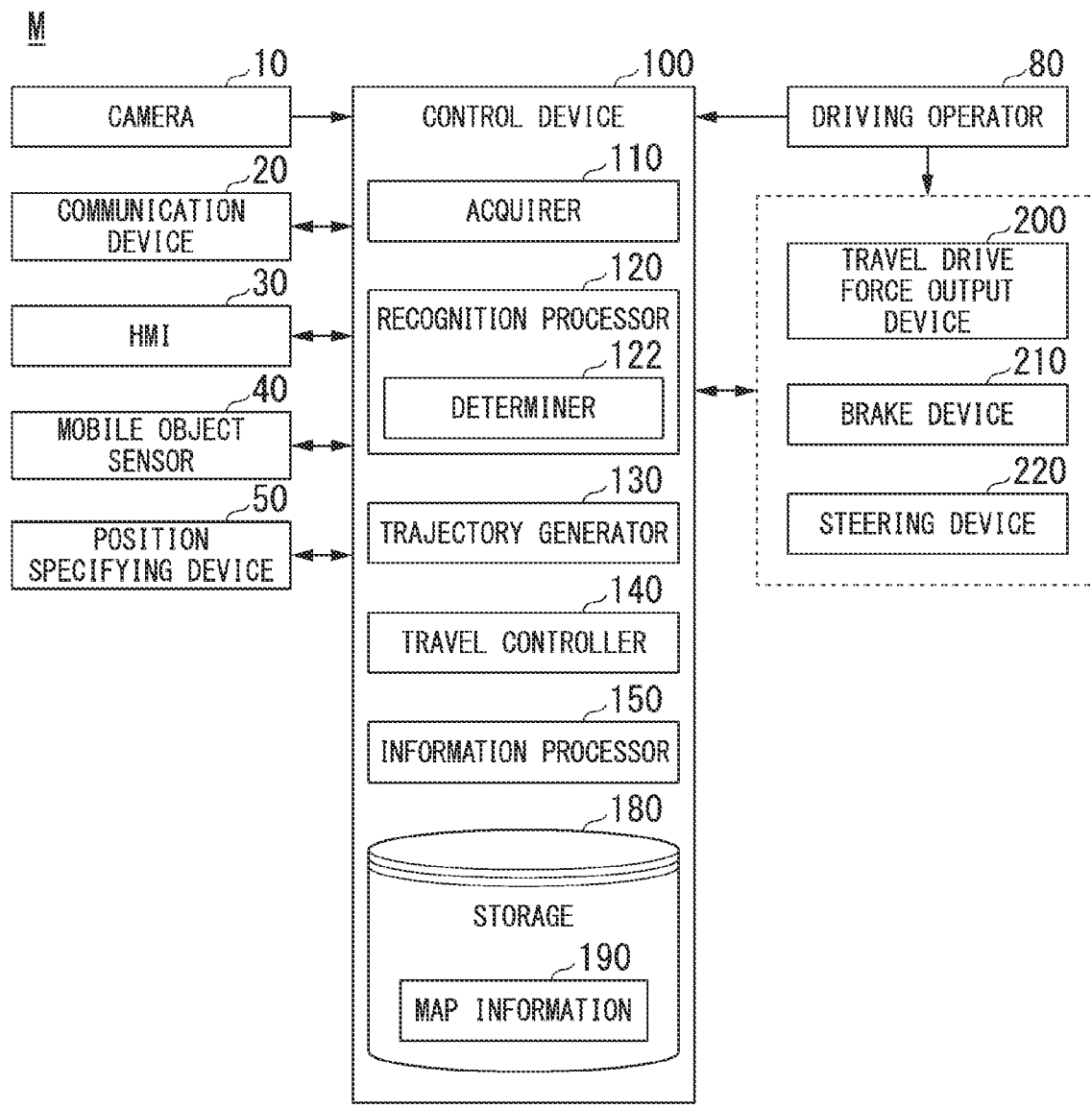
FIG. 2 is a diagram showing an example of another functional configuration included in a mobile object.

FIG. 2 is a diagram showing an example of another functional configuration included in the mobile object M. The mobile object M includes, for example, a camera 10, a communication device 20, an HMI 30, a mobile object sensor 40, a position specifying device 50, a driving operator 80, a control device 100, a travel drive force output device 200, a brake device 210, and a steering device 220.

The camera 10 captures the images around the mobile object M. The camera 10 is, for example, a fisheye camera capable of capturing the images around the mobile object M at a wide angle (for example, at 360 degrees). The camera 10 is attached to the upper part of the mobile object M, for example, and captures the images around the mobile object M at a wide angle in the horizontal direction. The camera 10 may be realized by combining a plurality of cameras (a plurality of cameras that capture a range of 120 degrees or a range of 60 degrees with respect to the horizontal direction). In addition to the camera 10, the mobile object M may include a radar device or LIDAR that detects an object.

The communication device 20 is a communication interface for communicating with other devices using a cellular network, a Wi-Fi network, Bluetooth (registered trademark), a dedicated short range communication (DSRC), or the like.

The HMI 30 presents various pieces of information to the user of the mobile object M and receives input operations of the user. The HMI 30 includes various display devices, speakers, buzzers, touch panels, switches, keys, and the like.

The mobile object sensor 40 includes a vehicle speed sensor that detects the speed of the mobile object M, an acceleration sensor that detects acceleration of the mobile object M, a yaw rate sensor that detects the angular speed around the vertical axis, and an azimuth sensor that detects the direction of the mobile object M, and the like.

The position specifying device 50 specifies the position of the mobile object M based on the signal received from a GNSS satellite. The position of the mobile object M may be specified or complemented by an inertial navigation system (INS) using the output of the mobile object sensor 40.

The driving operator 80 includes, for example, an acceleration pedal, a brake pedal, a shift lever, a steering wheel, a deformed steering wheel, a joystick, and other operators. Sensors that detect an amount of operation or the presence of an operation are attached to the driving operator 80, and the detection results are output to the control device 100, or any one or all of the travel drive force output device 200, the brake device 210, and the steering device 220. If the mobile object M is controlled only by automated driving, the driving operator 80 may be omitted.

The control device 100 includes, for example, an acquirer 110, a recognition processor 120, a trajectory generator 130, a travel controller 140, an information processor 150, and a storage 180. The acquirer 110, the recognition processor 120, the trajectory generator 130, the travel controller 140, and the information processor 150 each are realized when a hardware processor such as a central processing unit (CPU) or the like executes a program (software). Some or all of these components may be realized by hardware (a circuit portion; including circuitry) such as large scale integration (LSI), an application specific integrated circuit (ASIC), a field-programmable gate array (FPGA), or a graphics processing unit (GPU) and may be realized by the cooperation of software and hardware. The program may be stored in advance in the storage 180 (a storage device including a non-transitory storage medium) such as a HDD or a flash memory and may be stored in a removable storage medium such as a DVD or a CD-ROM and be installed in a HDD or a flash memory when a storage medium (a non-transitory storage medium) is attached to a drive device. Map information 190 is stored in the storage 180. Some functional units of the acquirer 110, the recognition processor 120, the trajectory generator 130, the travel controller 140, the information processor 150, and the storage 180 may be included in other devices. The functional configuration in which the recognition processor (processor), the trajectory generator 130, and the travel controller 140 are combined is an example of the "mobile object control system". The functional configuration in which the trajectory generator 130 and the travel controller 140 are combined is an example of the "controller".

The acquirer 110 acquires the image captured by the camera 10. The acquirer 110 acquires the image of a road surface around the mobile object M. Instead of the camera 10, the acquirer 110 may acquire an image captured by a camera provided at the road shoulder or a position different from the mobile object M. In this case, the control device 100 executes various processes using this image.

The recognition processor 120 recognizes an object or a situation around the mobile object M using, for example, the functions of artificial intelligence (AI) or the functions of a predetermined model, or using them in parallel. For example, the function of "recognizing the area where the mobile object M can move" may be realized by executing recognition of roads, sidewalks, curbs, and the like by deep learning and recognition based on a predetermined condition (signals which can be subjected to pattern matching) in parallel and scoring both recognition results to make comprehensive evaluation. The recognition processor 120 may execute a semantic segmentation process to classify pixels in the frame of an image into classes (for example, an object, a movable area, a non-movable area, and the like) and recognize an area in which the mobile object M can move based on the classification result. As a result, the reliability of the movement of the mobile object M is guaranteed.

The recognition processor 120 recognizes the state such as a position, a speed, an acceleration, and the like of an object around the mobile object M based on the image captured by the camera 10. The position of an object is recognized as the position on an absolute coordinate system in which a representative point (the center of gravity, the center of a driving shaft, or the like) of the mobile object M is at the origin, for example, and is used for control. The position of an object may be represented by a representative point such as the center of gravity or a corner of the object and may be represented by an area. The "state" of an object may include the acceleration or a jerk of an object or a "behavior state" (for example, whether the object has changed or is trying to change lanes). The recognition processor 120 recognizes, for example, lane marks, road shoulders, curbs, a median strip, guard rails, a temporary stop line, an obstacle, a sign, and other road events. The recognition processor 120 recognizes the position and posture of the mobile object M. The recognition processor 120 derives the degree of congestion in a predetermined area using the position of the object obtained from the image. The degree of congestion of the predetermined area may be obtained from another device. In this case, the communication device 20 acquires information indicating the degree of congestion from other devices.

The recognition processor 120 includes, for example, a determiner 122. The determiner 122 may be provided in a device different from the control device 100. The determiner 122 determines whether a target roadway is a pedestrian road where the passage of vehicles is restricted. For example, the determiner 122 determines whether a target road which may be a road (normal road) in which the passage of vehicles is not restricted or a road for pedestrians (pedestrian road) is a pedestrian road in which the passage of vehicles is restricted or a normal road in which the passage of vehicles is not restricted.

The trajectory generator 130 determines one or both of a stop position where the mobile object M stops and a moving position where the mobile object M moves based on the user's instruction, a movable area, and an area where the mobile object M cannot move.

The trajectory generator 130 generates a target trajectory along which the mobile object M moves in the future automatically (regardless of an operation of a driver) so that it is possible to cope with a surrounding situation of the mobile object M. The target trajectory includes a speed element, for example. For example, the target trajectory is represented as an arrangement of positions (trajectory points) that the mobile object M has to reach. The trajectory points are positions that the mobile object M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the mobile object M has to reach at respective sampling time points of the predetermined sampling periods. In this case, the information of the target speed and the target acceleration is represented by the intervals of the trajectory points.

The trajectory generator 130 generates a trajectory along which the mobile object M moves, and calculates the risk of the generated trajectory. The risk is an index value indicating the height of possibility that the mobile object M approaches an obstacle. The risk tends to become higher as the distance from the obstacle to the trajectory (trajectory point of the trajectory) is smaller, and become lower as the distance from the obstacle to the trajectory (trajectory point) is larger.

In the trajectory generator 130, when a total value of the risks and the risk of each trajectory point satisfy predetermined criteria (for example, when the total value is a threshold value Th1 or less and the risk of each trajectory point is a threshold value Th2 or less), a trajectory that satisfies the criteria is adopted as the trajectory along which the mobile object moves.

The travel controller 140 moves the mobile object M along a trajectory that satisfies predetermined criteria. The travel controller 140 outputs a command value for the mobile object M to move along the trajectory to the travel drive force output device 200.

The information processor 150 controls various apparatuses and devices included in the mobile object M. The information processor 150 controls, for example, the HMI 30. The information processor 150 acquires voice data input to the microphone and recognizes an operation performed on the operating unit.

The travel drive force output device 200 outputs a travel drive force (torque) for the mobile object M to move to the drive wheels. The travel drive force output device 200 includes, for example, an electric motor, and an electronic control unit (ECU) that controls these components. The ECU controls the above-mentioned components according to the information input from the travel controller 140 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the travel controller 140 or the information input from the driving operator 80 so that brake torque corresponding to a braking operation is output to each wheel.

The steering device 220 includes, for example, a steering ECU and an electric motor. The electric motor, for example, applies a force to a rack-and-pinion mechanism to change the direction of a steering wheel. The steering ECU drives an electric motor according to the information input from the travel controller 140 or the information input from the driving operator 80 to change the direction of the steering wheel.

[Overview of Control of Mobile Object]

Figure 3:
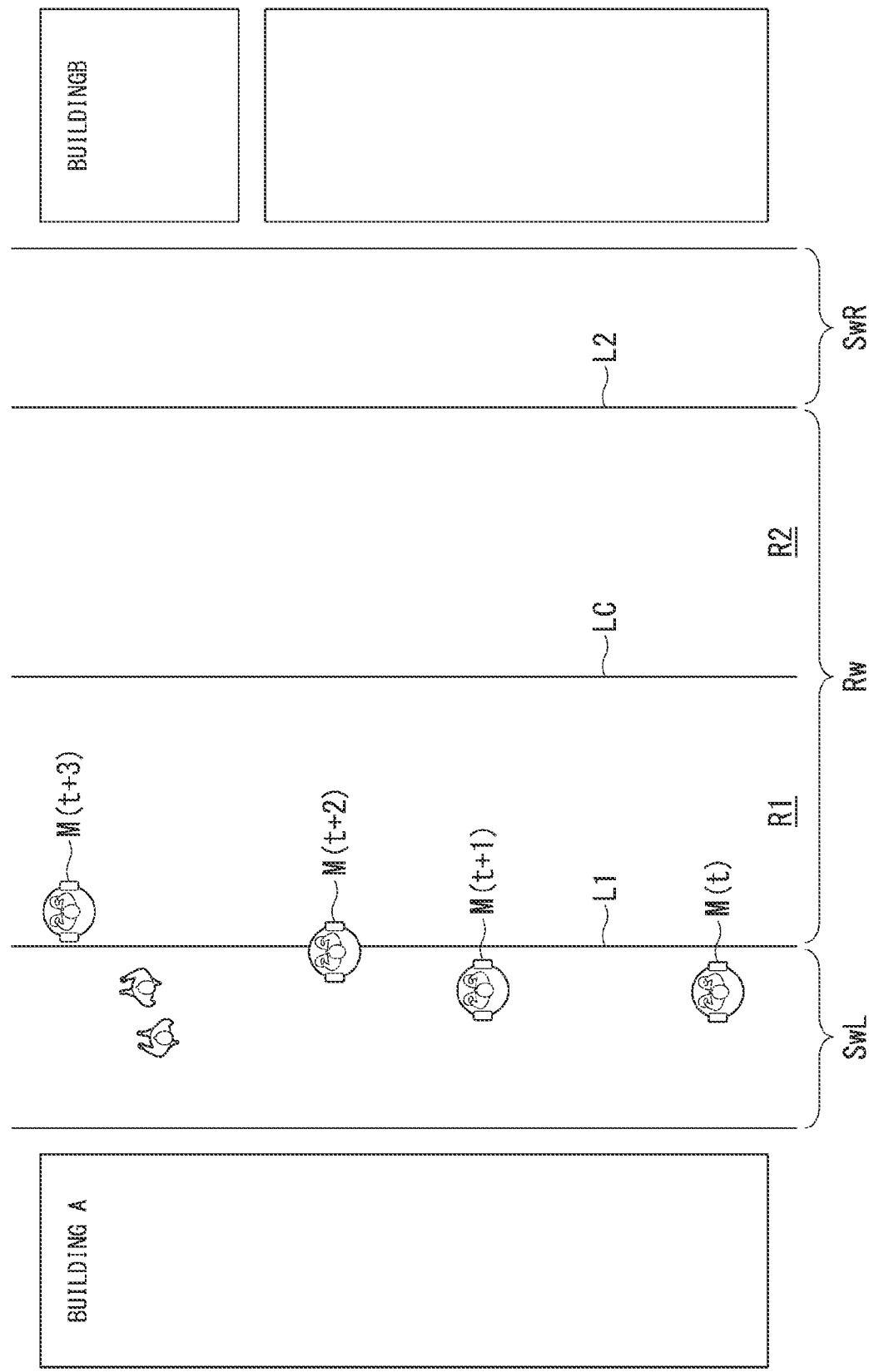
FIG. 3 is a diagram showing an example of the behavior of a mobile object.

FIG. 3 is a diagram showing an example of the behavior of the mobile object M. The mobile object M, for example, carries a user and heads for a destination. At this time, the mobile object M moves on the sidewalk SwL (time t, t+1), or descends from the sidewalk SwL to the roadway Rw and moves on the roadway Rw (time t+2, time t+3). The mobile object M, for example, moves on the sidewalk Sw at a speed as high as the walking speed of a pedestrian (for example, 4 km/h or 6 km/h), and, for example, travels on the roadway Rw at a speed higher than the above-mentioned walking speed. A sidewalk SwL is a sidewalk on the left side in relation to the traveling direction of the mobile object M, and a sidewalk SwR is a sidewalk present with the roadway Rw interposed. The roadway Rw includes a roadway R1 adjacent to the sidewalk SwL and a roadway R2 present between the roadway R1 and the sidewalk SwR. The sidewalk SwL and the roadway R1 are divided by a land mark L1 and the sidewalk SwR and the roadway R2 are divided by a lane mark L2. A lane center LC is displayed between the roadway R1 and the roadway R2.

When it is determined that the target road (target roadway) is a pedestrian road, the recognition processor 120 of the control device 100 expands the movable area in which the mobile object M can move in the width direction of the target road (target roadway). "Expanding" means that the movable area when it is determined that the target roadway is a pedestrian road is expanded in the width direction of the target roadway than the movable area when it is determined that the target road is not a pedestrian road. The recognition processor 120 searches for the movable area in which the mobile object M can move from the target area around the mobile object M. When the target road including the roadway on which the mobile object M enters or is entering is a pedestrian road where the passage of vehicles is restricted, the recognition processor 120 expands the search range for the movable area than when the target road is not a pedestrian road. The trajectory generator 130 generates a trajectory for moving the mobile object based on the searched movable area (movable area expanded in the width direction). The travel controller 140 controls the mobile object M so as to move the mobile object M based on the trajectory.

A "pedestrian road" is a pedestrian road where the passage of vehicles is restricted. The "pedestrian road where the passage of vehicles is restricted" means, for example, a road in which the traveling of vehicles is actually restricted on the entire road including roadways and only pedestrians can pass in a road in which the traveling of vehicles is restricted in the entire road including roadways and only pedestrians can pass in a preset period such as a predetermined time period or a predetermined date and time. A road in a pedestrian road in the state before the passage of vehicles is restricted (before the road becomes a pedestrian road) is sometimes referred to as a "normal road". The normal road is changed to a pedestrian road in areas with many pedestrians and in time periods with many pedestrians such as shopping districts and festivals. Hereinafter, specific examples of processing on normal roads and pedestrian roads will be described. The processes may be performed in combination as long as there is no contradiction.

The determiner 122 of the control device 100 may determine whether the road on which the mobile object M enters or is entering is a pedestrian road based on an image recognition result. Alternatively, the determiner 122 of the control device 100 may determine whether the road is a pedestrian road based on information provided by another device or preset information. The control device 100 acquires, for example, an image of the vicinity of a road, and determines that the road is a pedestrian road when a signboard or a sign indicating the pedestrian road included in the image or information indicating a pedestrian road such as other display objects, or an installation object. When a predetermined mode of passage of a predetermined type of mobile object (for example, a mobile object of the same type as the mobile object M) in the roadway of the target road is recognized, the determiner 122 determines that the road is a pedestrian road. The predetermined mode is the action, behavior, mode, and the like when the mobile object M passes on the pedestrian road. When another mobile object performs an action, behavior, mode, and the like similar to the action, behavior, mode, and the like stored in the storage 180 in advance, the determiner 122 determines that the target road is a pedestrian road.

The determiner 122 of the control device 100 may acquire the information provided from a server device that provides the information (provided information) indicating that the target road is a pedestrian road, and determine that the target road is a pedestrian road based on the acquired provided information. The control device 100 may determine whether the target road is a pedestrian road by referring to information associated with the information (date and time and time period) and the position information indicating a pedestrian road prepared in advance.

[Control when Moving on Normal Road]

Figure 4:
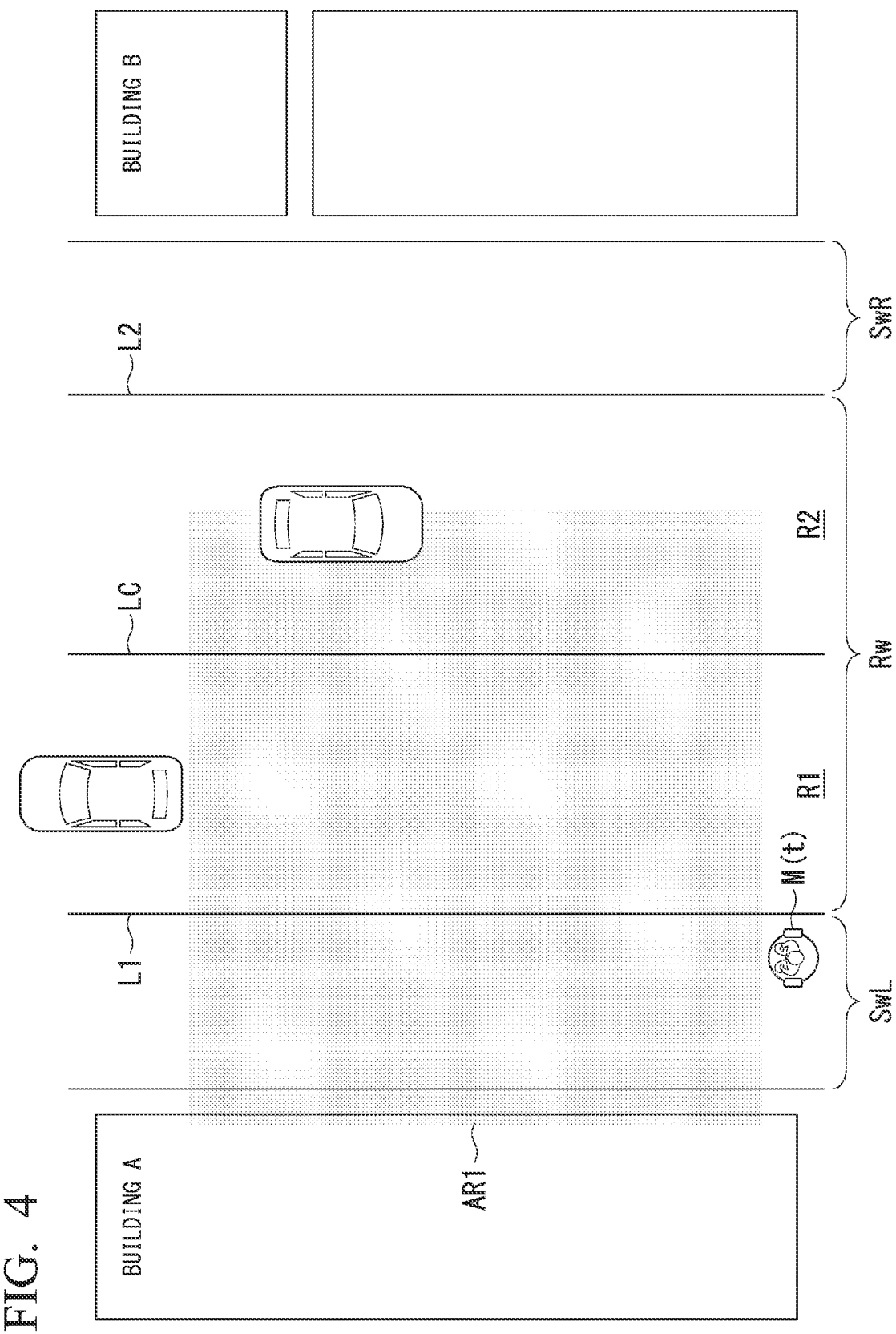
FIG. 4 is a diagram showing a search range on a normal road.

FIG. 4 is a diagram showing a search range on a normal road. The differences from those in FIG. 3 will be described. The control device 100 searches for a movable area in an area AR1 when the mobile object is entering a normal road or will enter the pedestrian road. The area AR1 is in front of the mobile object M, and includes, for example, a part of a building A adjacent to the sidewalk SwL, the sidewalk SwL, the roadway R1, and a part of the roadway R2. The range of the area AR1 is an example and may be a different range. The area in which the mobile object M recognizes a surrounding object or a surrounding situation may be the same area as the area AR1 or a different area (for example, a larger area including the area AR1).

Figure 5:
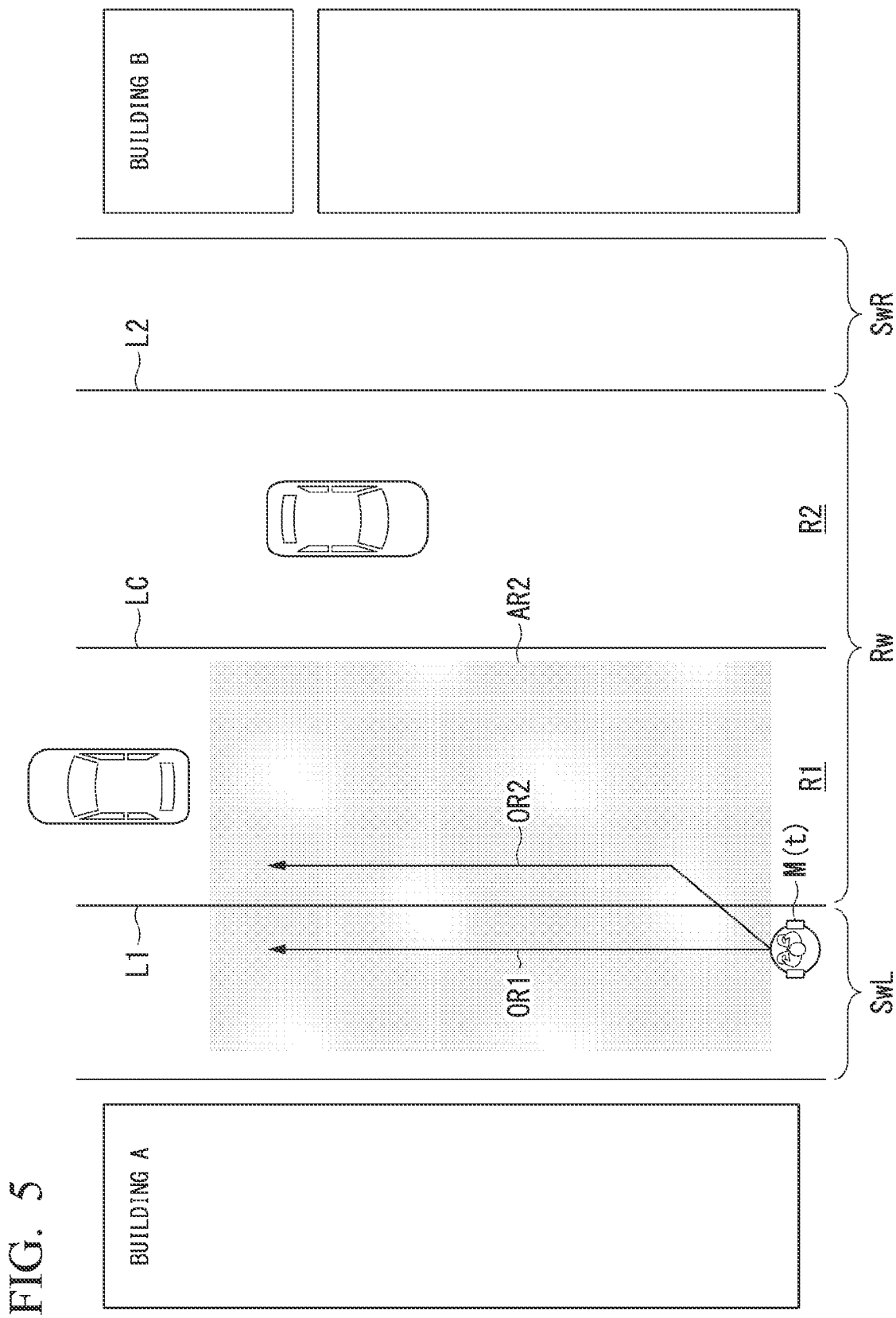
FIG. 5 is a diagram showing an example of a movable area on a normal road.

FIG. 5 is a diagram showing an example of a movable area AR2 on a normal road. The recognition processor 120 of the control device 100 derives the movable area AR2 based on the above-mentioned semantic segmentation processing, the position of an object in the area AR1, the traffic rule of the road, and the like. As shown in FIG. 5, the movable area AR2 is an area including the roadway R1 and the sidewalk SwL on which vehicles travel in the same direction as the traveling direction of the mobile object M. It is assumed that there is no object in the area AR2 and there is no object approaching the area AR2. The control device 100 generates a trajectory for moving the mobile object M in the movable area AR2. The control device 100 generates, for example, a trajectory OR1 for passing through the sidewalk SwL and a trajectory OR2 for passing through the roadway R1. The control device 100 selects a desired trajectory based on the surrounding situation, the destination direction, the target arrival time at the destination, and the like, and moves the mobile object M along the selected trajectory.

[Control (1) when Moving on a Pedestrian Road]

Figure 6:
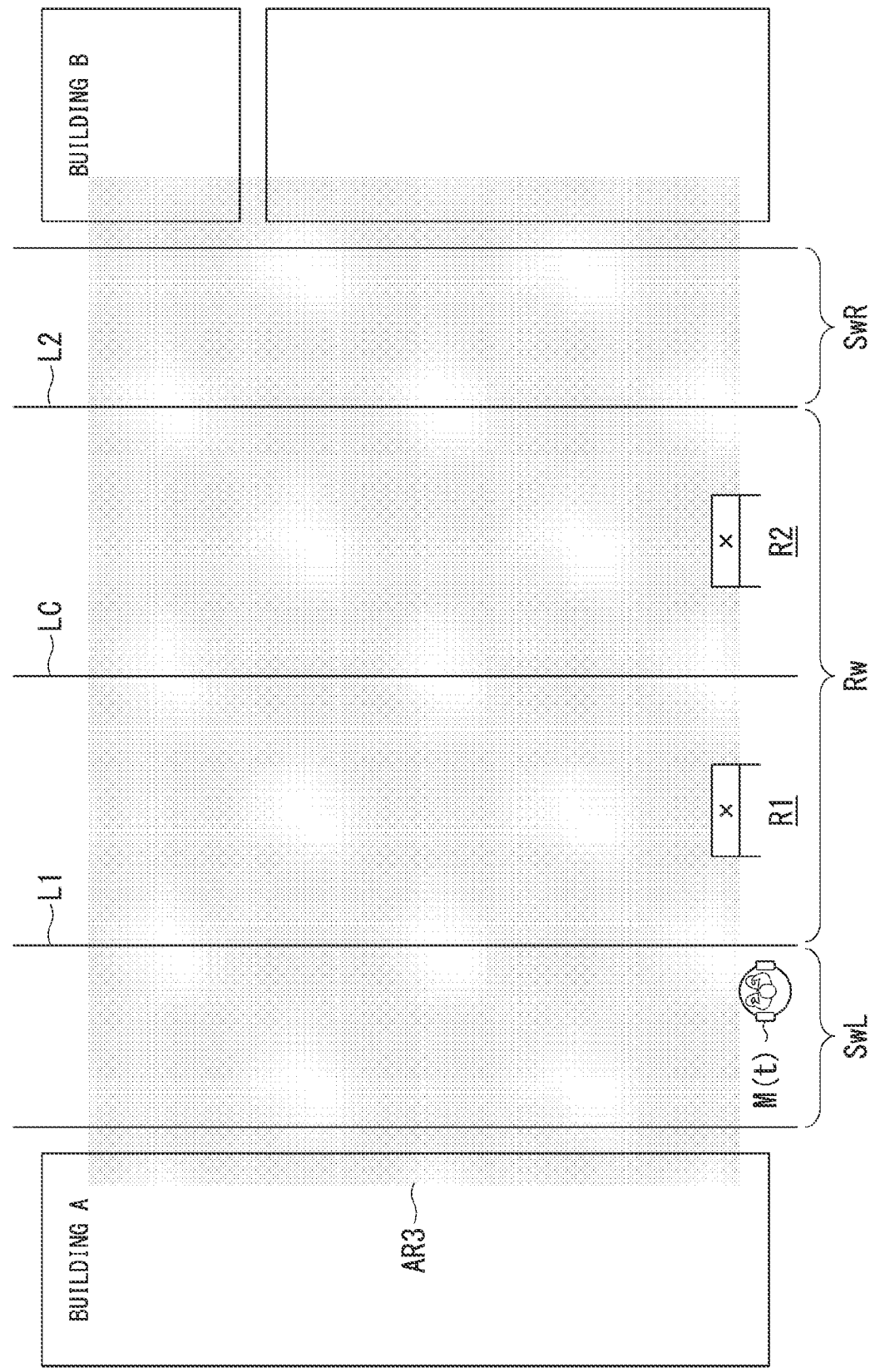
FIG. 6 is a diagram showing a search range on a pedestrian road.

FIG. 6 is a diagram showing a search range on a pedestrian road. The differences from those in FIGS. 3 and 4, and the like will be described. When the determiner 122 determines that the target road (target roadway) is a pedestrian road, the control device 100 expands the movable area so as to include more roadway areas than when it is determined that the target road is not a pedestrian road. For example, the control device 100 expands the search range for the movable area as follows, and expands the movable area based on the expanded search range. The control device 100 expands the search range for the movable area so as to include the area in front in the direction opposite to the side where the mobile object has deviated on the target road. The control device 100 searches for the movable area in the area AR3 when the mobile object is entering or will enter the pedestrian road. The area AR3 (an example of an "expanded search range") is, for example, in front of the mobile object M and includes a part of building A adjacent to the sidewalk SwL, the sidewalk SwL, the roadway R1, the roadway R2, the sidewalk SwR, and a part of the building adjacent to the sidewalk SwR. The range of the area AR3 is an example and may be a different range. The area AR3 is a wider range (a range expanded in the width direction) than the area AR1.

Figure 7:
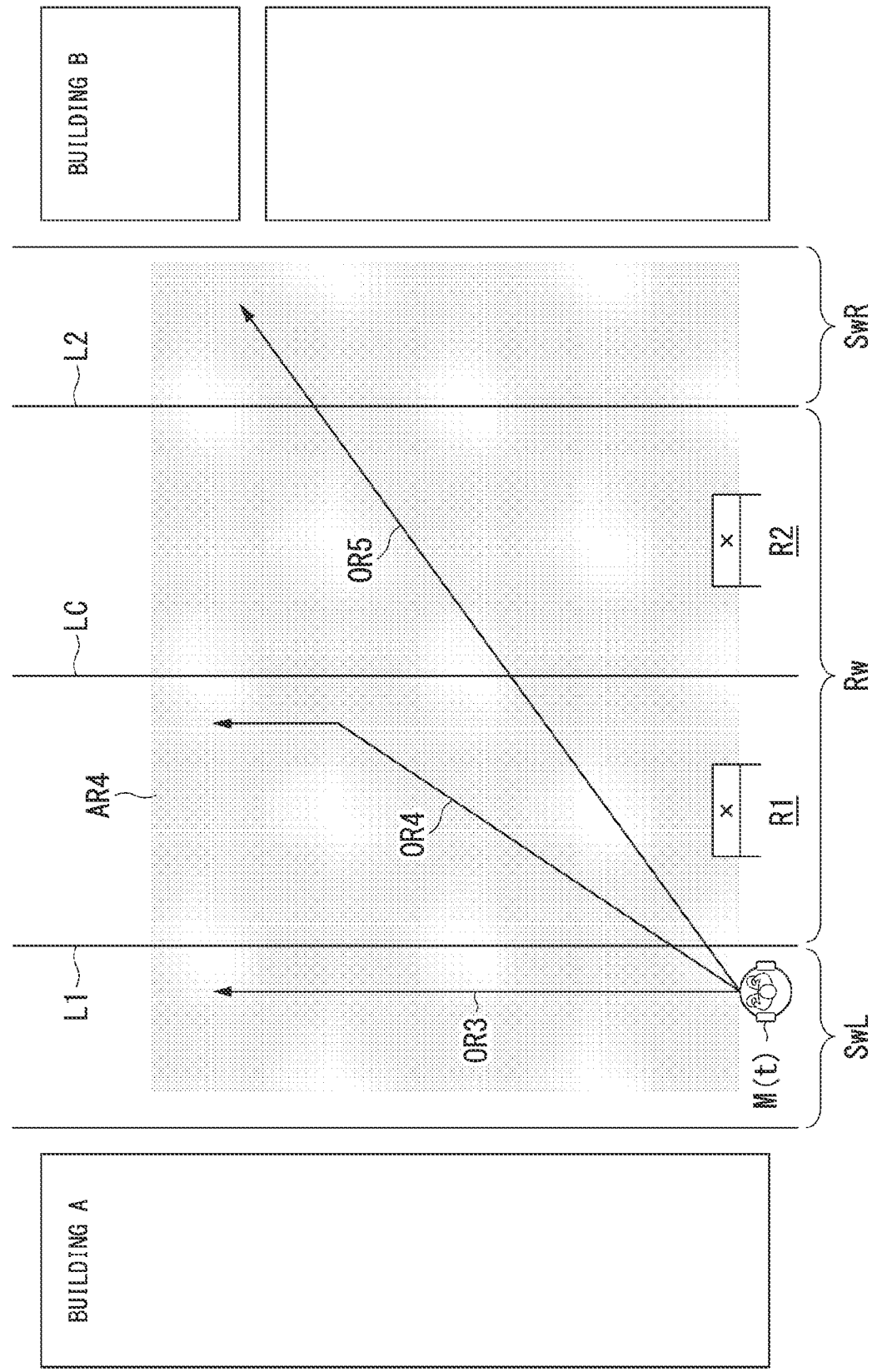
FIG. 7 is a diagram showing an example of a movable area on a pedestrian road.

FIG. 7 is a diagram showing an example of a movable area AR4 on the pedestrian road. The recognition processor 120 of the control device 100 derives the movable area AR4 based on the above-mentioned semantic segmentation processing, the position of an object in the area AR3, the traffic rule of the road, and the like. As shown in FIG. 7, the movable area AR4 is an area including the sidewalk SwL, the roadway R1, the roadway R2, and the sidewalk SwR. It is assumed that there is no object in the area AR4 and there is no object approaching the area AR4. In this way, the movable area is expanded in the width direction of the target road (target roadway).

The control device 100 generates a trajectory for moving the mobile object M in the movable area AR4. The control device 100 generates, for example, a trajectory OR3 to a roadway OR5. The trajectory OR3 is a trajectory in which the mobile object M moves on the sidewalk SwL.

A trajectory OR4 is a trajectory in which the mobile object M moves on the roadway RE The trajectory OR4 is an example of "a trajectory in which the mobile object M moves based on a lane mark close to the center of the roadway R1 on a pedestrian road". The "based on the lane mark close to the center" means that the control device 100 uses the lane mark to generate a trajectory, for example, that the control device 100 generates a trajectory parallel to (substantially parallel to) the lane mark or generates a trajectory with reference to the lane mark (at a predetermined distance in the road width direction from the lane mark).

A trajectory OR5 is a trajectory in which the mobile object M crosses the roadway R1 and the roadway R2 and heads for the sidewalk SwR. The trajectory generated in the movable area AR4 is not limited to the above, and may include other trajectories such as a trajectory moving on the roadway R2. In the above-described example, the example in which an object is not present has been described, but when an object is present, the area in which the object is present is excluded from the movable area.

For example, when the destination of the mobile object M is the building B adjacent to the sidewalk SwR, the control device 100 generates a trajectory OR5 in which the mobile object heads for the building B while passing through the roadway R1, the roadway R2, and the sidewalk SwR. In the illustrated example, the trajectory OR5 is not limited to a straight line, but may be a curved line or a zigzag line. The trajectory OR5 is an example of a trajectory in which "the mobile object crosses a roadway to move to the second sidewalk and the mobile object heads for the destination or a waypoint".

For example, when the mobile object M heads for a destination on a normal road, the mobile object M moves to a point where a signal is present, a point where a pedestrian crossing is provided, or the like, and detours toward the destination. On the other hand, on the pedestrian road, the mobile object M can expand the movable area by expanding the search range, and head for the destination along a reasonable route to the destination obtained from the movable area.

The control device 100 may control the mobile object M based on an area where the degree of congestion of objects on the sidewalk or the roadway included in the movable area is low. An object is a traffic participant or an object provided on a pedestrian road. A low degree of congestion means a low density per unit area and a small number of objects. For example, the mobile object M moves in an area where the degree of congestion is low. For example, the control device 100 may determine the degree of congestion for each road included in the movable area, and may move the mobile object M based on the road having a low degree of congestion. The degree of congestion for each road is the degree of congestion on the sidewalk or the degree of congestion on the roadway, and the degree of congestion on each of the sidewalk SwL, the roadway R1, the roadway R2, and the sidewalk SwR. For example, when the degree of congestion of the roadway R2 is low among the degrees of congestion of the sidewalk SwL, the roadway R1, the roadway R2, and the sidewalk SwR, the control device 100 may determine the road R2 as the road on which the mobile object M moves with a high priority.

The control device 100 may generate a trajectory that reasonably heads for the destination and allow the mobile object M to move in an area with a low degree of congestion. For example, the control device 100 may generate a plurality of trajectories or all possible trajectories, score factors such as the degree of congestion, the distance to the destination, and the time for each trajectory, and determine the trajectory of the mobile object M based on the result obtained by statistically processing the scores. For example, the mobile object M moves based on the trajectory with a high score.

The control device 100 may select a route among a route for moving on sidewalks, a route for moving on roadways, and a route for crossing roadways based on one or more of the destinations of the mobile object M, the degree of congestion of objects on the pedestrian road, and a request regarding the movement route designated by the user of the mobile object and move the mobile object along the selected route. For example, when the users request is a request to move along a route for moving on sidewalks, the control device 100 controls the mobile object M so as to move on sidewalks as much as possible. When the user's request is a request to move along a route for moving on roadways, the control device 100 controls the mobile object M so as to move on roadways as much as possible. When the users request is a request to move on a sidewalk on the opposite side (the sidewalk beyond a roadway), the control device 100 controls the mobile object M so as to cross the roadway and move on the sidewalk on the opposite side as much as possible. In this way, the control device 100 can control the movement of the mobile object M on the pedestrian road in response to the request of the user.

The control device 100 can derive a movable area suitable for the road condition and generate a more appropriate trajectory by expanding the search range and the movable area as described above. As a result, the control device 100 can realize more appropriate control according to the surrounding situation.

[Control (2) when Moving on Pedestrian Road]

When the destination of the mobile object M is present in the pedestrian road or is adjacent to the pedestrian road, the control device 100 may expand the search range for the movable area more than when the destination of the mobile object M is not present in the pedestrian road, or is not adjacent to the pedestrian road. The control device 100 expands the movable area in the width direction of the target road (target roadway) based on the result of the above-described processing.

Figure 8:
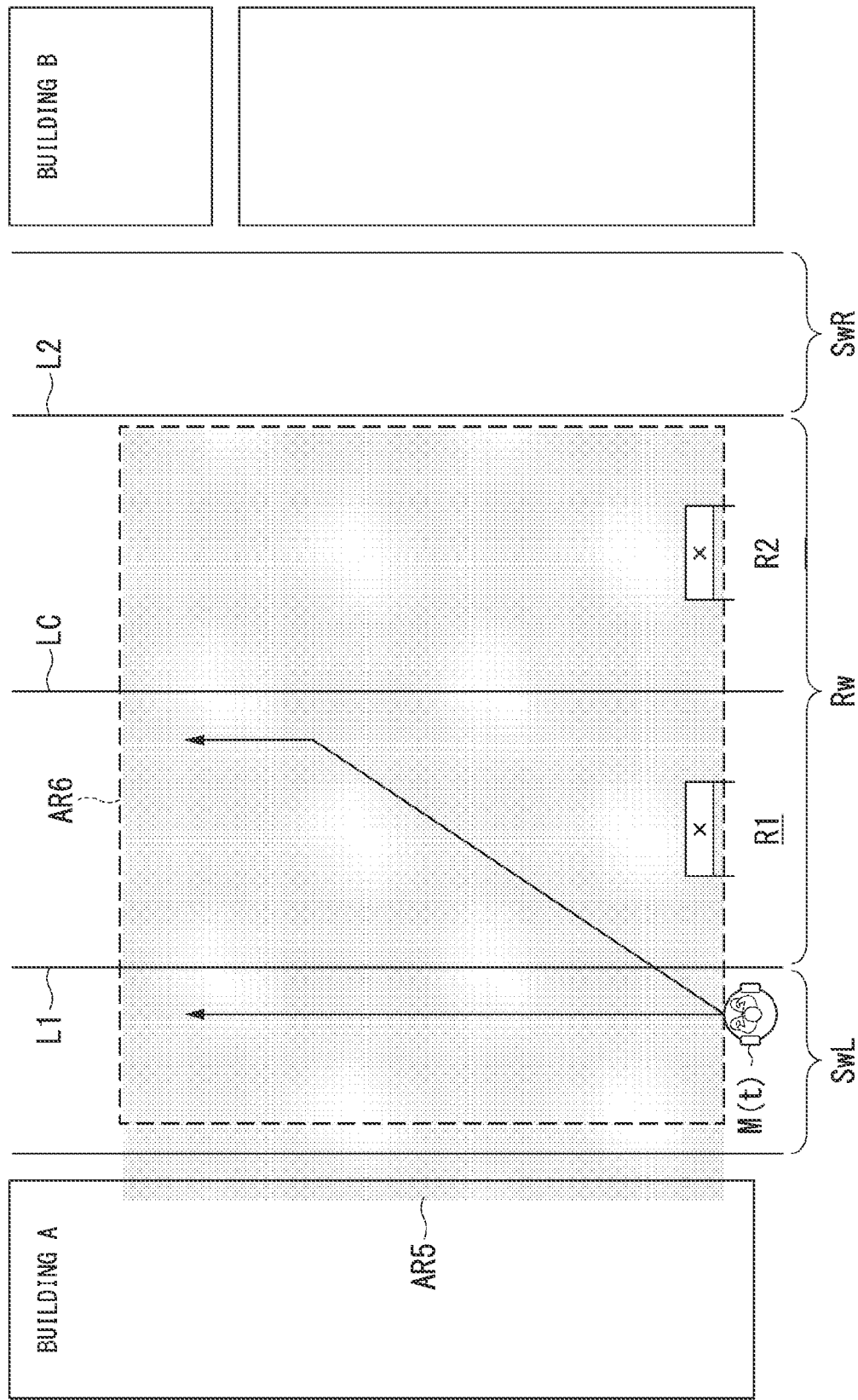
FIG. 8 is a diagram showing an example of a process of searching for a passage search area.

When the destination is present at the position related to the pedestrian road, the control device 100 may derive the movable area AR4 from the area AR3 as shown in FIGS. 6 and 7. When the destination is not present at the position related to the pedestrian road, the control device 100 may search for the movable area AR6 in the area AR5 as shown in FIG. 8. In other words, when the destination of the mobile object M is present in the pedestrian road or is adjacent to the pedestrian road, the control device 100 expands the search range for the movable area more than when the destination of the mobile object M is not present in the pedestrian road or is not adjacent to the pedestrian road. The destination being present at the position related to the pedestrian road means that the destination (or a waypoint) is present in the pedestrian road, adjacent to the pedestrian road, or near the pedestrian road. The waypoint includes a point where the mobile object M heads next, such as a road to pass after passing through a pedestrian road and a position to turn right or left.

Figure 9:
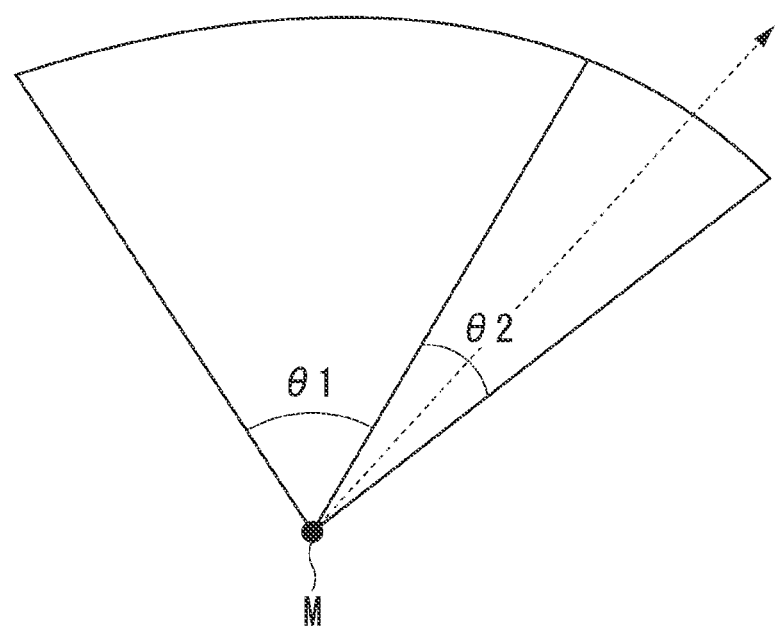
FIG. 9 is a diagram showing an example of the relationship between a destination and an area for searching for a movable area.

FIG. 9 is a diagram showing an example of the relationship between the destination and the area for searching for the movable area. In the example of FIG. 9, the search range is described as being fan-shaped. For example, when the destination is not present on the pedestrian road, the control device 100 sets the range of the angle θ1 with respect to the mobile object M as the search range. For example, when the destination is present on the pedestrian road, the control device 100 expands the search range so that the search range includes the direction of the destination. For example, when the destination is present in the range of the angle θ2, the search range is a range corresponding to the combined angle of the angle θ1 and the angle θ2.

The control device 100 can derive an appropriate search range, movable area, and trajectory based on the direction and position of the destination or waypoint with respect to the pedestrian road. As a result, the control device 100 can realize appropriate control in consideration of the destination and the waypoint.

In each of the above-described (or the following) examples, the control device 100 may adjust the search range in consideration of the degree of congestion of objects. For example, when the degree of congestion of objects in a first search range is equal to or greater than a threshold value, the control device 100 may expand the first search range to a second search range larger than the first search range. As a result, the control device 100 can derive a movable area in which the degree of congestion is equal to or less than the threshold value.

[Control (1) when Entering Pedestrian Road]

After the mobile object M enters the pedestrian road, the control device 100 expands the search range for the movable area, and expands the movable area in the width direction based on the expanded search range. When a specific event that restricts the movement of the mobile object M has occurred or is predicted to occur in the area in front of the pedestrian road, the control device 100 expands the search range for the movable area after the mobile object M enters the pedestrian road without expanding the search range for the movable area before the mobile object M enters the pedestrian road.

Figure 10:
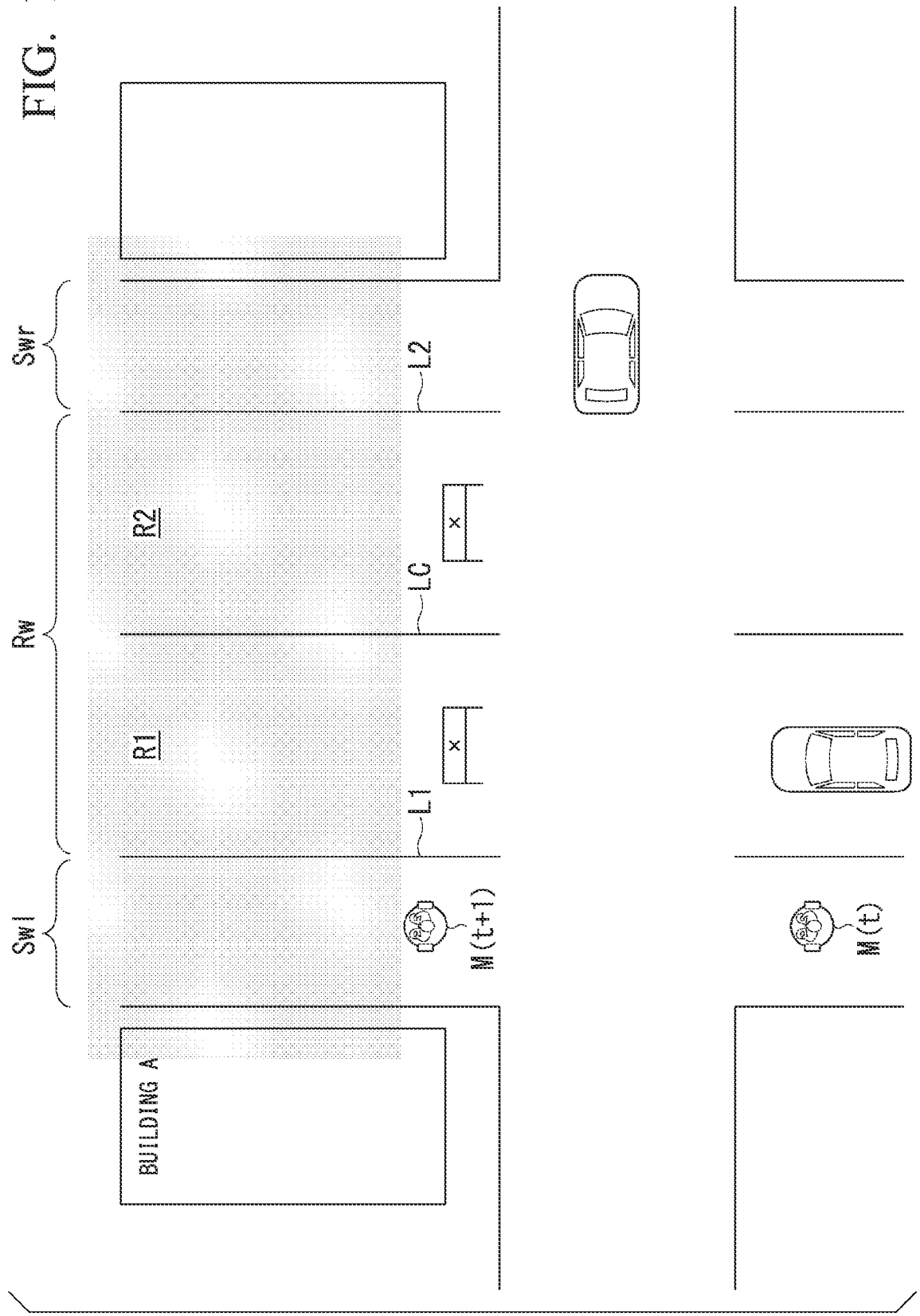
FIG. 10 is a diagram showing an example of a situation in which the search range is not expanded before a mobile object enters a pedestrian road.

FIG. 10 is a diagram showing an example of a situation in which the search range is not expanded before the mobile object M enters the pedestrian road. For example, when an intersection is present in front of a pedestrian-only road, it is determined or predicted that a specific event that restricts the movement of the mobile object M has occurred, and the search range is not expanded. The specific event is, for example, that the movement of the mobile object M is restricted by an object such as a vehicle different from a pedestrian, or that there is an environment in which it is required to pay attention to an object such as a vehicle. The specific event includes, for example, the presence of an intersection as shown in FIG. 10, the presence of a traveling vehicle, the possibility of a traveling vehicle, and a predetermined degree or more of the possibility of a traveling vehicle.

As described above, when a specific event that restricts the movement of the mobile object M occurs or is predicted to occur in the area in front of the pedestrian road, the control device 100 expands the search range after the mobile object M enters the pedestrian road (or just before entering or about several meters to 10 meters before entering, in areas where the specific event has not occurred, in areas where it is predicted that the event will not occur, and the like). In this way, it possible to prevent the search range and the movable area from being unnecessarily expanded in a situation where it is not necessary to expand the movable area in which the mobile object M can move.

[Control (2) when Entering Pedestrian Road]

The control device 100 expands the search range for the movable area before the mobile object M enters the pedestrian road when a specific event that restricts the movement of the mobile object M has not occurred or is predicted to not occur in the area in front of the pedestrian road. The control device 100 expands the search range for the movable area so as to include, for example, an area in front in the direction opposite to the side where the mobile object has deviated on the road in front of the target road. As a result, the movable area is expanded to the target road (target roadway) before the mobile object M enters the pedestrian road.

Figure 11:
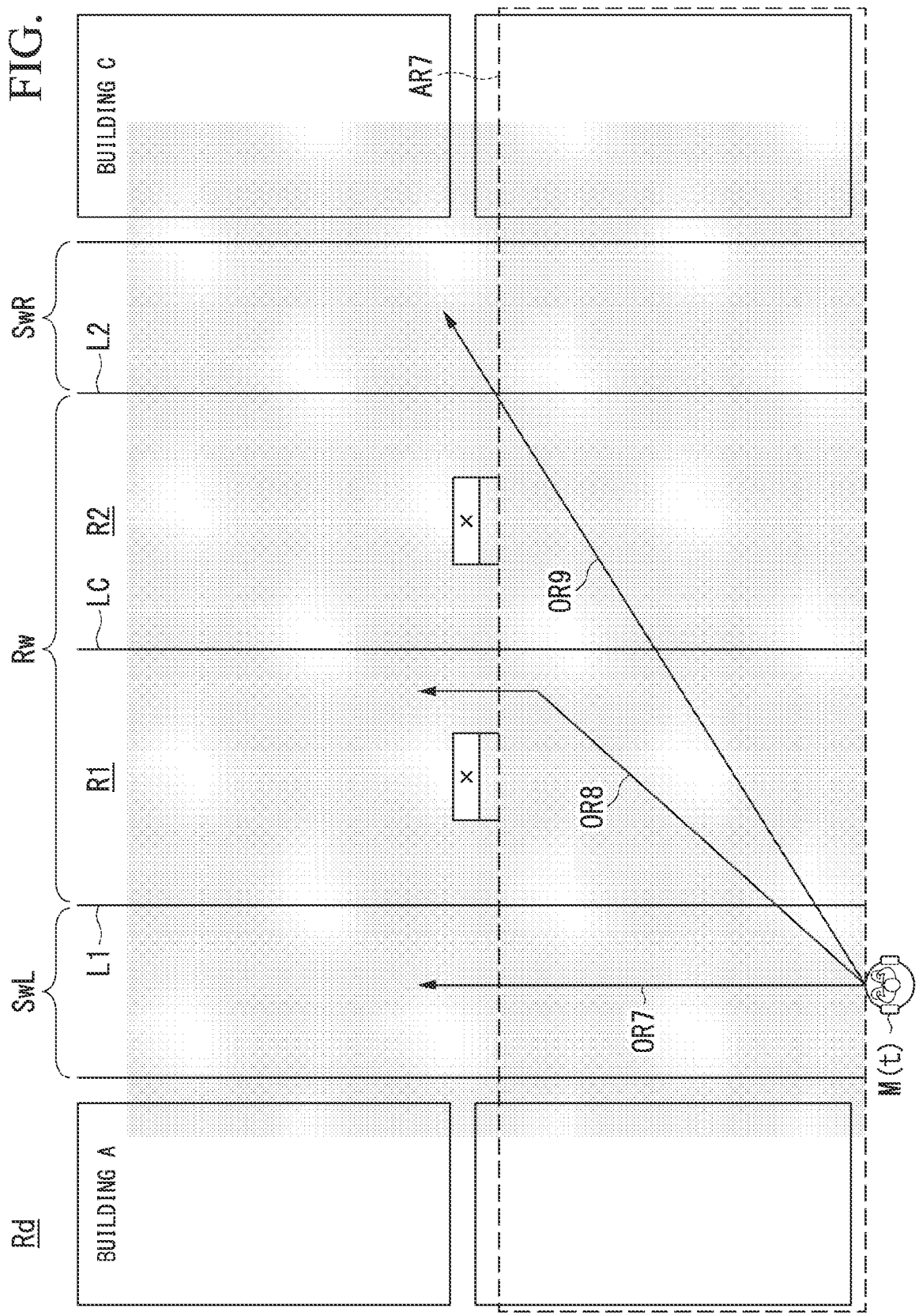
FIG. 11 is a diagram showing an example of a situation in which a search range is expanded before a mobile object enters a pedestrian road.

FIG. 11 is a diagram showing an example of a situation in which the search range is expanded before the mobile object M enters the pedestrian road. For example, in the target road Rd, the back side of the area AR7 is a pedestrian road, and the area AR7 is an area in front (the road in front) connected to the pedestrian road. The area in front may be a normal road. The area AR7 is included in the search range when a specific event that restricts the movement of the mobile object M has not occurred or is not expected to occur in the area AR7. As shown in FIG. 11, when it is predicted that a specific event such as a vehicle passing through the area AR7 does not occur (when the degree of occurrence is less than or equal to the threshold value if it occurs), the control device 100 expands the search range before the mobile object M enters the pedestrian road.

The control device 100 generates a trajectory based on, for example, the degree of congestion in the area AR7, the position of the destination, the direction of the destination, and the like. For example, as shown in FIG. 11, the control device 100 generates trajectories OR7 to OR9 in which the mobile object M moves in an area before entering the pedestrian road. The trajectory OR7 is a trajectory for moving on the sidewalk SwL. The trajectory OR8 is a trajectory for moving the mobile object M along the vicinity of the center of the roadway Rw based on the lane mark that divides the roadway R1 and the roadway R2. The trajectory OR9 is a trajectory that crosses the roadway Rw and enters the sidewalk SwR. The trajectories OR8 and OR9 are trajectories generated when crossing the roadway R1 or the roadway R2 is permitted by traffic rules. The trajectory OR9 may be generated, for example, when the destination (or waypoint) is in the pedestrian road or in front of the pedestrian road. For example, the control device 100 allows the mobile object M to move along the trajectory OR8 when the degree of congestion near the center of the roadway Rw is small. For example, when the destination is present in the direction of the sidewalk SwR (when the building C is the destination in the figure), the control device 100 allows the mobile object M to move along the trajectory OR9.

As described above, the control device 100 can increase the degree of freedom regarding the movement of the mobile object M by expanding the search range and the movable area even before entering the pedestrian road. As a result, the control device 100 can allow the mobile object M to smoothly move or move along a reasonable route.

In the control when entering the pedestrian road, when the destination of the mobile object M is present in the pedestrian road and is adjacent to the pedestrian road, the search range may be more expanded in front of the pedestrian road than when the destination of the mobile object M is not present in the pedestrian road and is not adjacent to the pedestrian road. For example, when the destination is present in the pedestrian road, in front of the pedestrian road, or immediately after passing the pedestrian road, the search range may be expanded as shown in FIG. 11. In other cases, the search range may be smaller than the expanded range shown in FIG. 11. The search range may be expanded when a specific event has not occurred or is predicted not to occur. After the mobile object M enters the pedestrian road, the control device 100 may expand the search range for the movable area than before entering the pedestrian road. As a result, the movable area is expanded to the target road (target roadway) after the mobile object M enters the pedestrian road.

[Flowchart]

Figure 12:
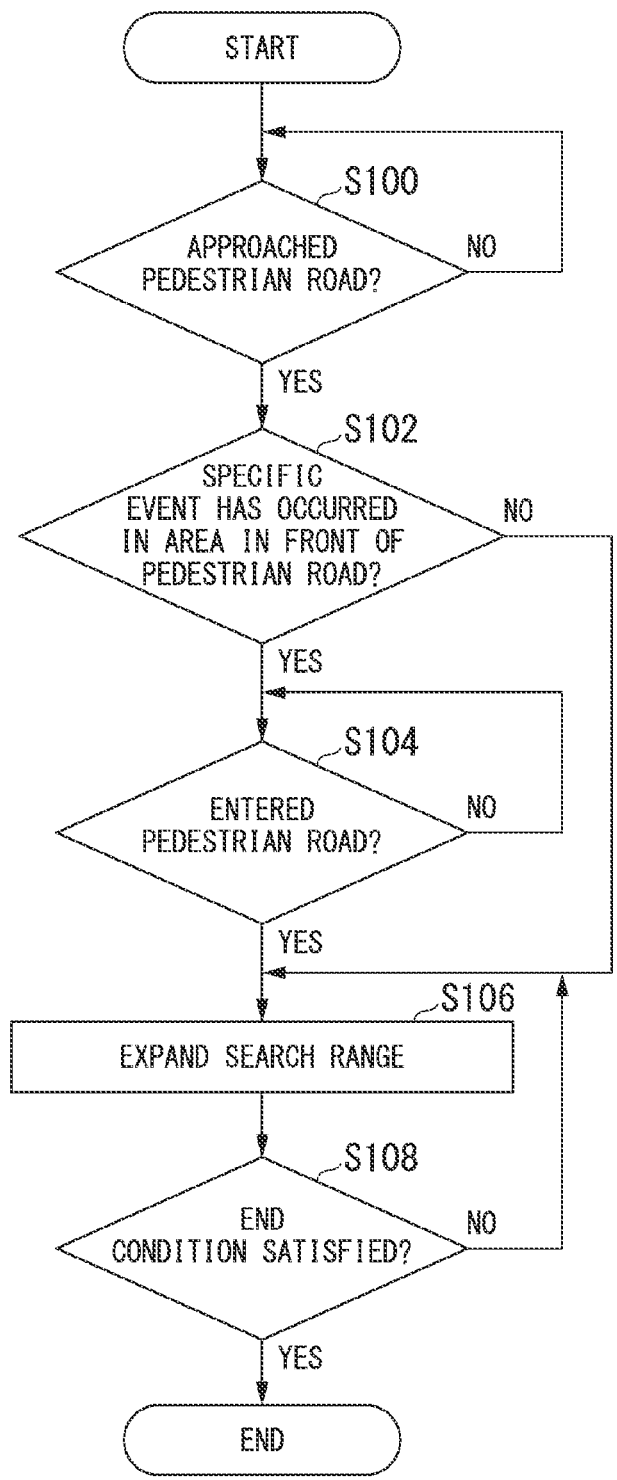
FIG. 12 is a flowchart showing an example of the flow of processing executed by a control device.

FIG. 12 is a flowchart showing an example of the flow of processing executed by the control device 100. First, the control device 100 determines whether the mobile object M has approached a pedestrian road (step S100). When the mobile object M has approached the pedestrian road, the control device 100 determines whether a specific event has occurred (or is expected to occur) in an area in front of the pedestrian road (step S102). When the specific event has not occurred (or is predicted to not occur) in the area in front of the pedestrian road, the control device 100 expands the search range (step S106). The control device 100 expands the search range in front of the pedestrian road.

When a specific event has occurred (or is expected to occur) in the area in front of the pedestrian road, the control device 100 determines whether the mobile object M has entered the pedestrian road (step S104). When the mobile object M has entered the pedestrian road, the control device 100 expands the search range (step S106). In the pedestrian road, the control device 100 continues the process of expanding the search range. Next, the control device 100 determines whether an end condition is satisfied (step S108). The process returns to the process of step S106 when the end condition is not satisfied, and the process of this flowchart ends when the end condition is satisfied. The end condition is, for example, approaching the end point of the pedestrian road, reaching the end point of the pedestrian road, passing the pedestrian road, and the like.

As described above, the control device 100 can set an appropriate search range according to the road condition and expand the movable area. As a result, the control device 100 can generate a trajectory in which the mobile object M moves in the movable area according to the road condition. As a result, the control device 100 can control the mobile object M according to the surrounding situation.

The embodiments described above can be expressed as follows.

A control device including: a storage device that stores a program; and a hardware processor, wherein the hardware processor executes the program stored in the storage device to execute: determining whether a roadway road is a pedestrian road in which passage of vehicles is restricted; expanding a movable area in which the mobile object can move in a width direction of the roadway road when it is determined that the roadway road is the pedestrian road; and controlling the mobile object based on the movable area.

While modes for carrying out the present invention have been described using embodiments, the present invention is not limited to these embodiments, and various changes and substitutions can be made without departing from the spirit of the present invention.

What is claimed is:

1. A mobile object control system comprising:
a storage device configured to store instructions; and
one or more processors,
wherein the one or more processors execute the instructions stored in the storage device to:
determine whether a target roadway is a pedestrian road in which passage of vehicles is restricted;
expand a movable area in which a mobile object can move in a width direction of the target roadway when it is determined that the target roadway is the pedestrian road; and
control the mobile object based on the movable area.

2. The mobile object control system according to claim 1, wherein
the one or more processors execute the instructions stored in the storage device to:
expand the movable area so as to include more roadway areas when it is determined that the target roadway is the pedestrian road.

3. The mobile object control system according to claim 1, wherein
the one or more processors execute the instructions stored in the storage device to:
expand the movable area in a width direction of the target roadway by expanding a search range for the movable area in the width direction of the target roadway when it is determined that the target roadway is the pedestrian road.

4. The mobile object control system according to claim 1, wherein
the one or more processors execute the instructions stored in the storage device to:
expand the movable area in a width direction of the target roadway when a destination of the mobile object is present in the pedestrian road or is adjacent to the pedestrian road more than when the destination of the mobile object is not present in the pedestrian road or is not adjacent to the pedestrian road.

5. The mobile object control system according to claim 1, wherein
the one or more processors execute the instructions stored in the storage device to:
expand the movable area in a width direction of the target roadway so as to include an area in front in a direction opposite to a side where the mobile object has deviated in a road in front of the target roadway or in the target roadway.

6. The mobile object control system according to claim 1, wherein
the one or more processors execute the instructions stored in the storage device to:
move the mobile object along a trajectory generated based on a lane mark close to a center of the target roadway in the pedestrian road.

7. The mobile object control system according to claim 1, wherein
the one or more processors execute the instructions stored in the storage device to:
expand the movable area in a width direction of the target roadway after the mobile object enters the pedestrian road.

8. The mobile object control system according to claim 1, wherein
the one or more processors execute the instructions stored in the storage device to:
expand the movable area in a width direction of the target roadway before the mobile object enters the pedestrian road when a specific event that restricts movement of the mobile object has not occurred or is expected to not occur in an area in front of the pedestrian road.

9. The mobile object control system according to claim 1, wherein
the one or more processors execute the instructions stored in the storage device to:
determine a degree of congestion for each road included in the movable area and move the mobile object based on a road with a low degree of congestion.

10. The mobile object control system according to claim 1, wherein
the movable area includes a first sidewalk, a second sidewalk, and a roadway provided between the first sidewalk and the second sidewalk on the pedestrian road, and
the one or more processors execute the instructions stored in the storage device to:
move the mobile object so as to cross the roadway to move to the second sidewalk and direct the mobile object to head for a destination or a waypoint when the destination or waypoint of the mobile object present on the first sidewalk or the roadway is present in a direction of the second sidewalk.

11. The mobile object control system according to claim 1, wherein
the movable area includes a sidewalk and a roadway on the pedestrian road, and
the one or more processors execute the instructions stored in the storage device to:
select a route from a route for moving on the sidewalk, a route for moving on the roadway, and a route that crosses the roadway based on one or more factors of a destination of the mobile object, a degree of congestion of objects on the pedestrian road, and a request regarding a movement route designated by a user of the mobile object and move the mobile object along the selected route.

12. The mobile object equipped with the mobile object control system according to claim 1.

13. A control method for causing a computer to execute:
    determining whether a roadway is a pedestrian road in which passage of vehicles is restricted;
    expanding a movable area in which a mobile object can move in a width direction of the roadway when it is determined that the roadway is the pedestrian road; and
    controlling the mobile object based on the movable area.

14. A non-transitory computer storage medium storing a program causing a computer to execute:
    determining whether a target roadway is a pedestrian road in which passage of vehicles is restricted;
    expanding a movable area in which a mobile object can move in a width direction of the target roadway when it is determined that the target roadway is the pedestrian road; and
    controlling the mobile object based on the movable area.

\* \* \* \* \*